(12) United States Patent
Liu et al.

(10) Patent No.: US 8,525,797 B2
(45) Date of Patent: Sep. 3, 2013

(54) TOUCH SCREEN DISPLAY WITH ELECTRIC FIELD SHIELDING LAYER

(75) Inventors: Chen-Yu Liu, Jhongli (TW); Shun-Ta Chien, Dayuan Township, Taoyuan County (TW)

(73) Assignee: TPK Touch Solutions, Inc., Taipei (TW)

( * ) Notice: Subject to any disclaimer, the term of this patent is extended or adjusted under 35 U.S.C. 154(b) by 1052 days.

(21) Appl. No.: 12/007,715

(22) Filed: Jan. 15, 2008

(65) Prior Publication Data
US 2009/0122021 A1 May 14, 2009

(30) Foreign Application Priority Data
Nov. 9, 2007 (TW) .............................. 96142519 A (51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| | | | |
|---|---|---|---|
| 6,177,918 B1 | 1/2001 | Colgan et al. | |
| 2002/0135568 A1* | 9/2002 | Chen .............................. | 345/173 |
| 2002/0167621 A1* | 11/2002 | Chen .............................. | 349/12 |
| 2005/0105009 A1* | 5/2005 | Dunn et al. ..................... | 349/21 |
| 2005/0126831 A1 | 6/2005 | Richter et al. | |
| 2010/0020045 A1* | 1/2010 | Walsh et al. .................. | 345/176 |

* cited by examiner

*Primary Examiner* — Quan-Zhen Wang
*Assistant Examiner* — Tony Davis
(74) *Attorney, Agent, or Firm* — Gokalp Bayramoglu; Anna Tsang (57) ABSTRACT

Disclosed is a touch screen display with an electric field shielding layer arranged between a liquid crystal layer of an LCD device and a glass substrate, having a touch sensing layer arranged on a top surface thereof, so that the electric field shielding layer isolates signal interference between the touch sensing layer and the liquid crystal layer.

11 Claims, 7 Drawing Sheets

TOUCH SCREEN DISPLAY WITH ELECTRIC FIELD SHIELDING LAYER

FIELD OF THE INVENTION

The present invention relates to a touch screen display, and more particularly to a touch screen display with electric field shielding layer.

BACKGROUND OF THE INVENTION

An LCD (Liquid crystal display) device with a touch screen display integrated thereinto has been widely applied as, for example, the display for portable notebook computer, and the input device for cellular phone, electric household appliances, public information systems, office automated apparatus, etc.

A conventional touch screen display mainly includes a glass substrate being coated on one surface with a layer of transparent conductive layer, such as an indium-tin oxide conductive layer; a thin film being coated on a bottom surface with a transparent conductive layer corresponding to the transparent conductive layer on the glass substrate; and a plurality of insulating dot spacers provided between the transparent conductive layer on the glass substrate and the transparent conductive layer below the thin film for spacing the two transparent layers from each other. When the touch screen display is touched during an operation, a touch signal is generated and transmitted to a controller via a signal line. There is also another type of conventional touch screen display that adopts a capacitive touch sensing structure.

Among different structural designs for conventional LCD devices, there is a thin film transistor (TFT) LCD that mainly includes a glass substrate, a liquid crystal layer, two polarizing plates, a color filter layer, a backlight source, a pixel electrode layer located below the liquid crystal layer, and a common electrode layer located atop the liquid crystal layer. The common electrode layer and the pixel electrode layer together form a liquid crystal driving electrode layer for driving the liquid crystal layer.

Another type of LCD device is referred to as an in-plane switching mode (IPS mode) LCD, which is structurally similar to the TFT LCD, except that it adopts a horizontally arranged liquid crystal driving electrode structure formed between the glass substrate and a bottom surface of the liquid crystal layer. The liquid crystal driving electrode layer includes a plurality of staggered pixel electrodes and common electrodes for driving the liquid crystal layer.

While the integrated touch screen display and LCD device provides high practicability, it has the problem of mutual interference between the touch signal and the liquid crystal driving signal due to a extremely close distance between the touch screen display and the liquid crystal layer, the pixel electrode, and the common electrode of the LCD.

Further, in an analysis on capacitive effect, it is found the interference of capacitive coupling exists between the pixel and common electrodes of the LCD device and a touch sensing layer of the touch screen display. In addition, there is also interference of high-frequency signal between the LCD module and the touch sensing layer. These interferences are noise interferences in terms of the capacitive coupling formed between the touch sensing layer and a part of human body, and would adversely affect the accuracy in detecting the position of a touched point on the touch screen display. Meanwhile, a relatively high driving voltage used to obtain enhanced brilliance further intensifies the problem of noise interference.

The above-mentioned problems of signal interference occur in both the general TFT LCD and the IPS mode LCD.

SUMMARY OF THE INVENTION

A primary object of the present invention is to provide a touch screen display provided with an electric field shielding layer to isolate noises between a touch screen display and an LCD device of the touch screen display, so that the detection of a touched point on the touch screen display and the visual display via the LCD are not mutually interfered by noises.

Another object of the present invention is to provide an in-plane switching mode (IPS mode) LCD device with electric field shielding structure, so as to give the IPS mode LCD device an enhanced noise isolating ability.

To achieve the above and other objects, the touch screen display according to the present invention includes an electric field shielding layer formed between a liquid crystal layer of the LCD device and a glass substrate for the touch screen display for isolating signal interference between a touch sensing layer of the touch screen display and the liquid crystal layer. The electric field shielding layer may be selectively located between a color filter layer of the LCD device and the glass substrate for the touch screen display, or between the color filter layer and the liquid crystal layer. For the IPS mode LCD, the electric field shielding layer may be arranged between a color filter layer and an over-coating layer, or to replace the over-coating layer. The electric field shielding layer may be a transparent electrical conductive layer having a continuous plane surface or having a net structure. Moreover, the electric field shielding layer may be connected to a ground potential, a potential having a predetermined voltage level, or a floating potential.

With the above arrangements, the electric field shielding layer may isolate noises between the LCD device and the touch sensing layer, so that a capacitive coupling formed between the touch sensing layer and any part of human body is not interfered to thereby increase the accuracy in detecting the position of a touched point on the touch screen display. In the present invention, the arrangement of the electric field shielding layer, either between the color filter layer of the LCD device and the glass substrate for the touch screen display or between the color filter layer and the liquid crystal layer, requires only simple manufacturing process to achieve good electric field shielding effect without increasing the manufacturing cost. For an IPS mode LCD, the electric field shielding layer may be arranged between the color filter layer and the over-coating layer or to replace the over-coating layer. Therefore, the electric field shielding effect could be achieved without complicating the manufacturing process or increasing the material cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
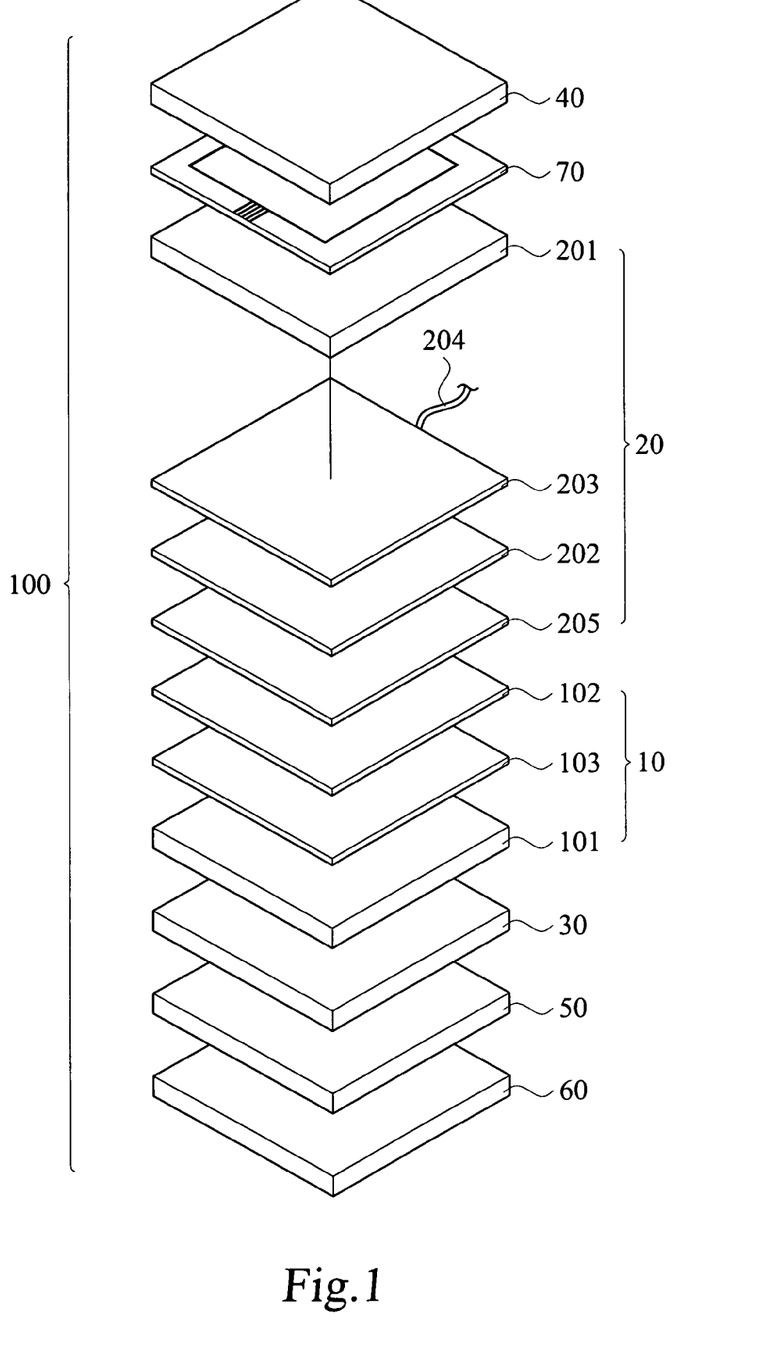
FIG. 1 is an exploded perspective view of a touch screen display with electric field shielding layer according to a first embodiment of the present invention.
Figure 2:
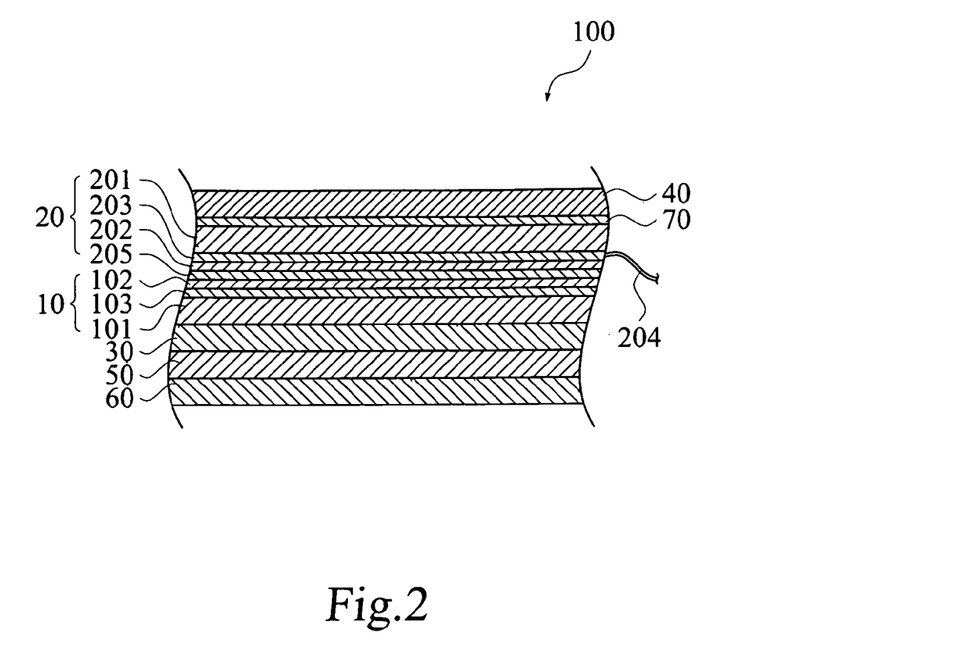
FIG. 2 is an assembled sectional view of FIG. 1.

Please refer to FIGS. 1 and 2 that are exploded perspective and assembled sectional views, respectively, showing a touch screen display 100 with electric field shielding layer according to a first embodiment of the present invention includes a liquid crystal control structure 10, a color filter structure 20, a first polarizing plate 30, a second polarizing plate 40, a diffusing plate 50, a backlight source 60, and a touch sensing layer 70.

The liquid crystal control structure 10 is arranged below the color filter structure 20. The first embodiment of the present invention will now be described based on an in-plane switching mode (IPS mode) LCD. In the illustrated first embodiment, the liquid crystal control structure 10 includes a first glass substrate 101, a liquid crystal layer 102, and a liquid crystal driving electrode layer 103 arranged on a top surface of the first glass substrate 101.

Figure 3:
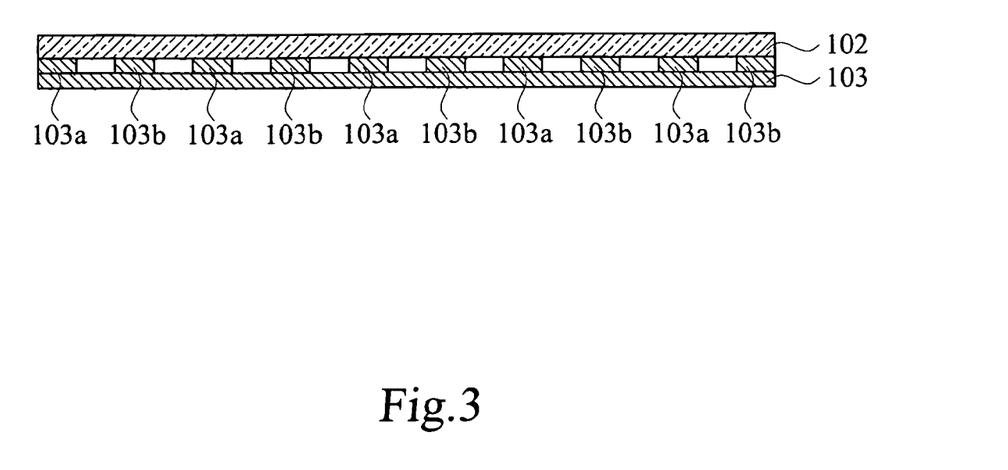
FIG. 3 shows a detailed structure between a liquid crystal driving electrode layer and a liquid crystal layer shown in FIG. 2.

FIG. 3 is a sectional view showing a detailed structure between the liquid crystal driving electrode layer 103 and the liquid crystal layer 102 shown in FIG. 2. As shown, the liquid crystal driving electrode layer 103 includes a plurality of horizontally staggered pixel electrodes 103a and common electrodes 103b. The pixel electrodes 103a and the common electrodes 103b together form the liquid crystal driving electrode layer 103 for driving liquid crystal molecules of the liquid crystal layer 102.

The first polarizing plate 30 is a known product and arranged on a bottom surface of the first glass substrate 101 opposite to the liquid crystal layer 102, and the diffusing plate 50 and the backlight source 60 are sequentially arranged below the first polarizing plate 30. The backlight source 60 supplies light to the touch screen display 100.

The color filter structure 20 includes a second glass substrate 201 arranged below the second polarizing plate 40. The touch sensing layer 70 may be, for example, a capacitive touch sensing structure, and is arranged between the second glass substrate 201 and the second polarizing plate 40. The touch sensing layer 70 senses a touch signal when a user touches the touch screen and accordingly it generates a pressure against the touch sensing layer 70 via the second polarizing plate 40. The touch signal sensed by the touch sensing layer 70 is transmitted via a signal line to a controller (not shown) for calculating position coordinates of a point touched by the user.

The color filter structure 20 also includes a color filter layer 202 arranged on a bottom surface of the second glass substrate 201. According to the first embodiment, an electric field shielding layer 203 is further arranged between the second glass substrate 201 and the color filter layer 202. The electric field shielding layer 203 provides a signal shielding function to effectively isolate signal interference between the liquid crystal layer 102 and the touch sensing layer 70. Further, the electric field shielding layer 203 is connected via a wire 204 or other functionally equivalent wiring to a predetermined potential, such as a ground potential, a potential with a predetermined voltage level, or a floating potential. In the illustrated first embodiment, the color filter structure 20 further includes an over-coating layer 205 arranged on a bottom surface of the color filter layer 202.

The touch sensing layer 70 and the electric field shielding layer 203 may be made of an indium-tin oxide (ITO) or any other transparent film material with uniform resistance value, and may be formed with a known technique, including physical film forming process, such as sputtering, or chemical film forming process, such as chemical vapor deposition (CVD).

Figure 4:
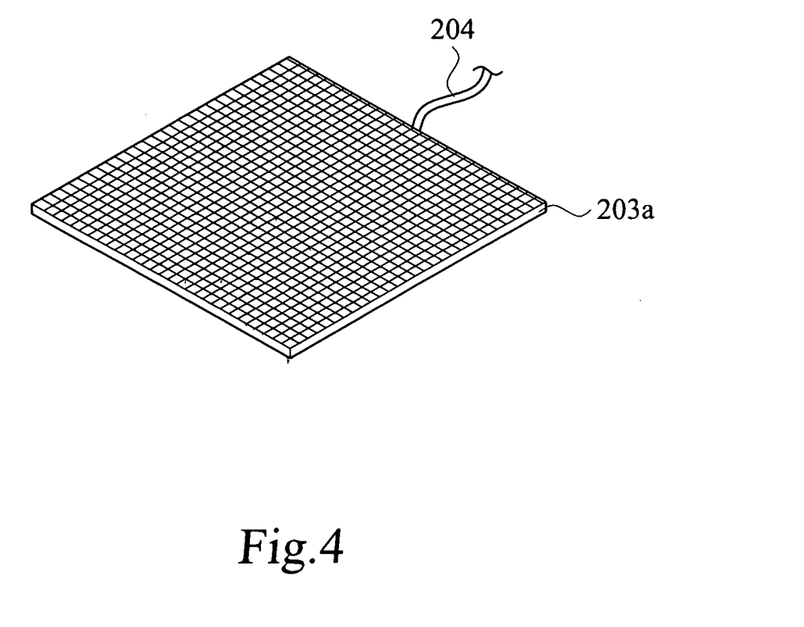
FIG. 4 shows a net-like electric field shielding layer having meshes.

The electric field shielding layer 203 is a continuous plane structure, such as a thin film uniformly formed on the bottom surface of the second glass substrate 201. Alternatively, the electric field shielding layer 203 may be designed to have a net structure or any other structure providing equivalent electric field shielding effect. For example, FIG. 4 shows an electric field shielding layer 203a of net structure with meshes.

Figure 5:
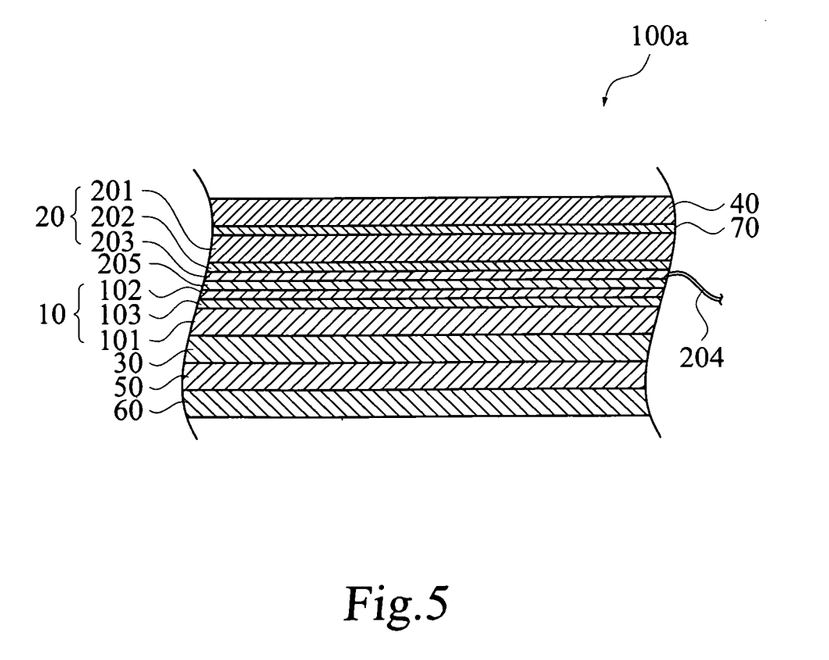
FIG. 5 is an assembled sectional view of a touch screen display with electric field shielding layer according to a second embodiment of the present invention.

Please refer to FIG. 5 that is an assembled sectional view of a touch screen display 100a with electric field shielding layer according to a second embodiment of the present invention. The second embodiment is generally structurally similar to the first embodiment, except that the electric field shielding layer 203 thereof is arranged between the color filter layer 202 and the over-coating layer 205 of the color filter structure 20 to equally effectively isolate the signal interference between the liquid crystal layer 102 and the touch sensing layer 70.

Figure 6:
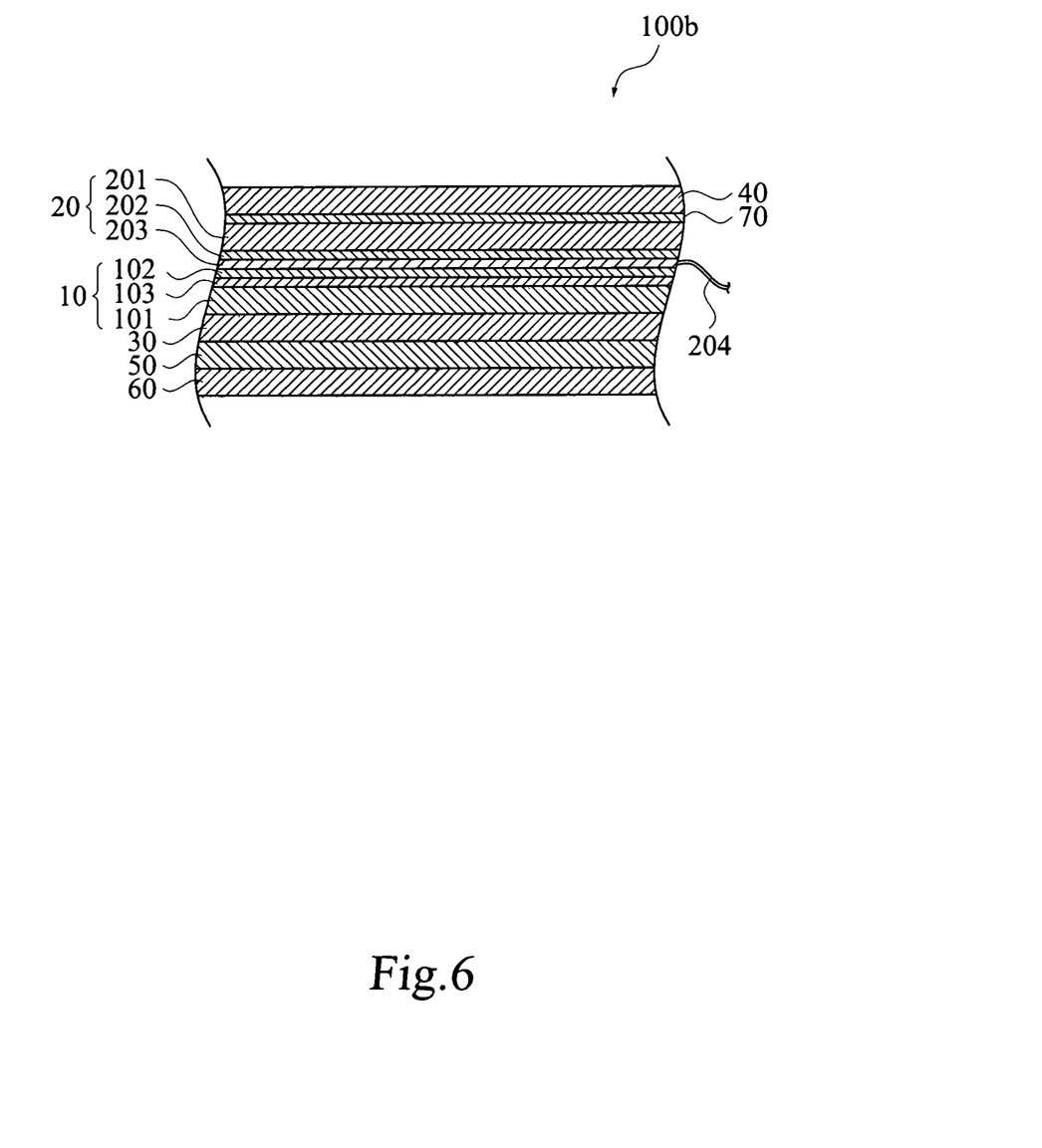
FIG. 6 is an assembled sectional view of a touch screen display with electric field shielding layer according to a third embodiment of the present invention.

Please refer to FIG. 6 that is an assembled sectional view of a touch screen display 100b with electric field shielding layer according to a third embodiment of the present invention. The third embodiment is generally structurally similar to the second embodiment, except that the electric field shielding layer 203 thereof is arranged between the color filter layer 202 of the color filter structure 20 and the liquid crystal layer 102 of the liquid crystal control structure 10 to not only provide the function of isolating the signal interference between the liquid crystal layer 102 and the touch sensing layer 70, but also replace the over-coating layer 205. Therefore, in the third embodiment, the over-coating layer 205 is omitted, and the touch screen display 100b may be manufactured with simplified process and reduced material cost.

Figure 7:
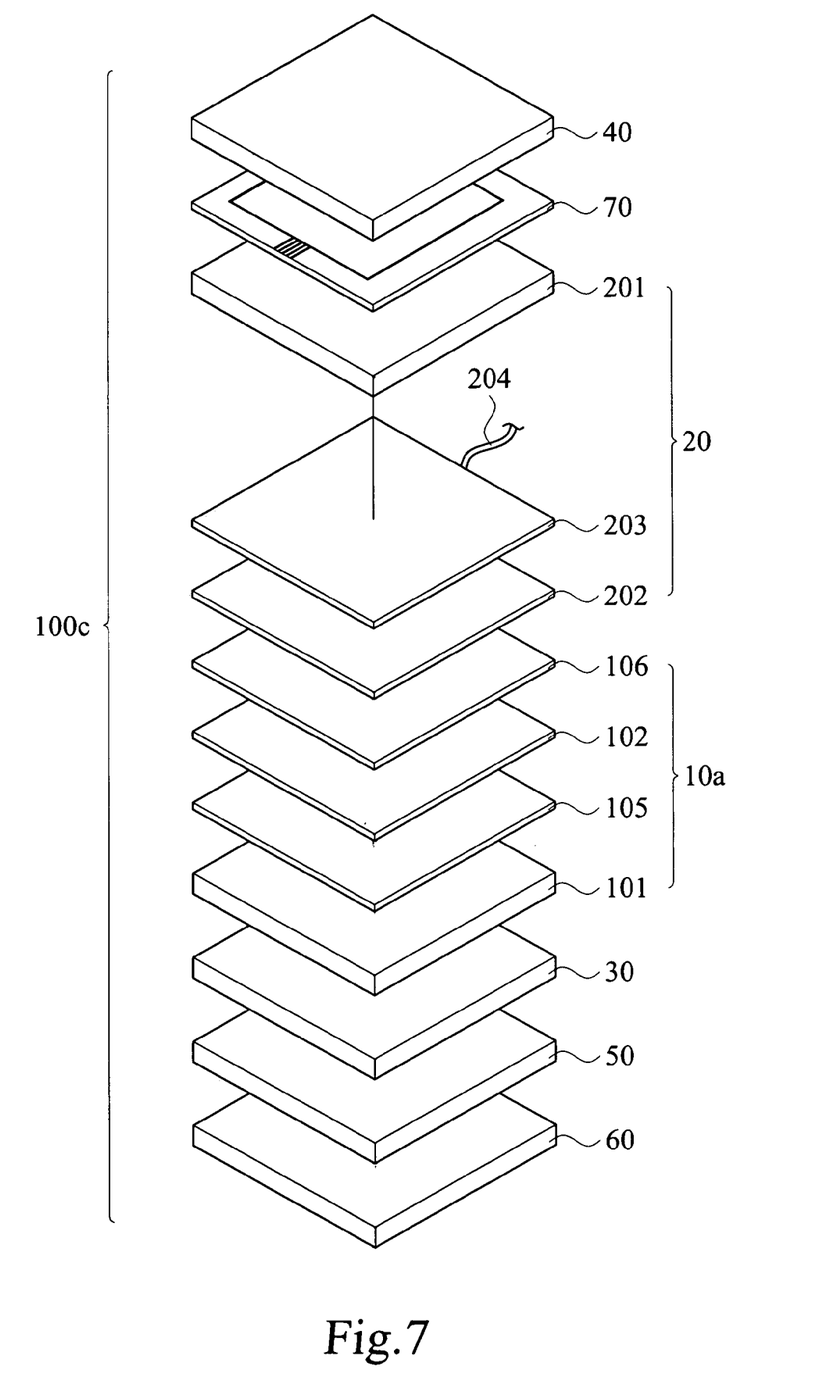
FIG. 7 is an exploded perspective view of a touch screen display with electric field shielding layer according to a fourth embodiment of the present invention.
Figure 8:
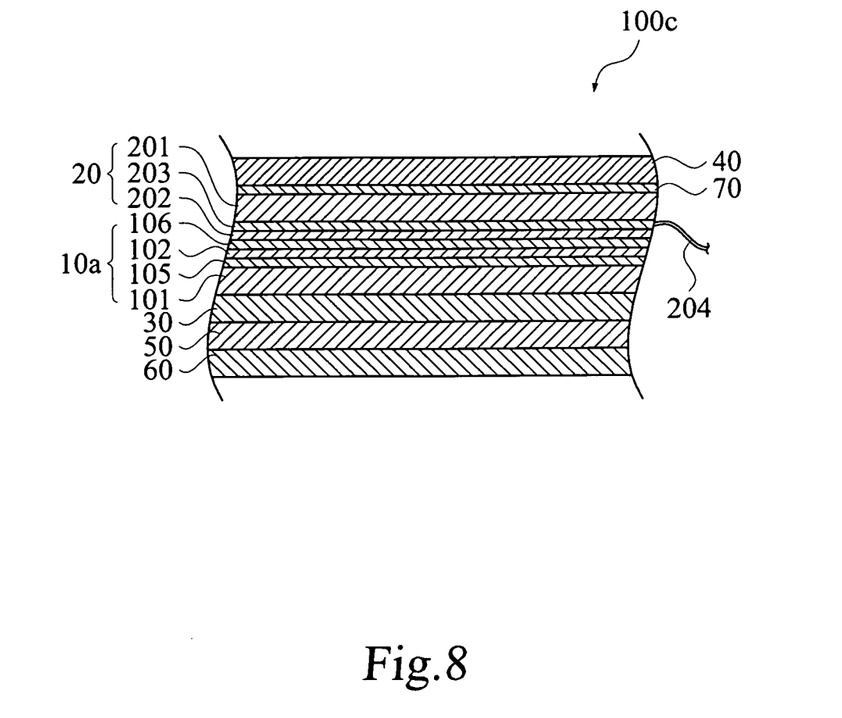
FIG. 8 is an assembled sectional view of FIG. 7.

While the above first to third embodiments are described based on the IPS mode LCD device, the present invention may also be applied to a general LCD device. For example, FIGS. 7 and 8 are exploded perspective and assembled sectional views, respectively, of a touch screen display 100c with electric field shielding layer according to a fourth embodiment of the present invention. The touch screen display 100c of the fourth embodiment has major parts generally similar to the first embodiment, except that the fourth embodiment is applied to a general LCD device.

Figure 9:
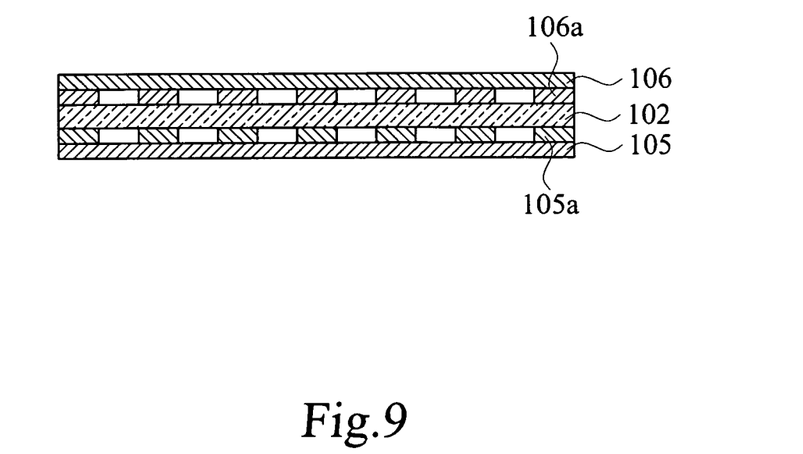
FIG. 9 shows a detailed structure between a liquid crystal driving electrode layer and a liquid crystal layer shown in FIG. 8.

The liquid crystal control structure 10a in the fourth embodiment includes a pixel electrode layer 105 arranged to a bottom surface of the liquid crystal layer 102. FIG. 9 is a sectional view showing a detailed structure between a liquid crystal driving electrode layer and the liquid crystal layer 102 shown in FIG. 8. The pixel electrode layer 105 includes a plurality of pixel electrodes 105a, and a common electrode layer 106 is arranged on a top surface of the liquid crystal layer 102. The common electrode layer 106 includes a plurality of common electrodes 106a corresponding to the plurality of pixel electrodes 105a. The pixel electrode layer 105 and the common electrode layer 106 together form the liquid crystal driving electrode layer for driving liquid crystal molecules of the liquid crystal layer 102.

In the fourth embodiment, there is also an electric field shielding layer 203 arranged between the second glass substrate 201 and the color filter layer 202. The electric field shielding layer 203 provides a signal shielding function to not only effectively isolate signal interference between the liquid crystal layer 102 and the touch sensing layer 70, but also isolate signal interference between the common electrode layer 106 and the touch sensing layer 70.

Figure 10:
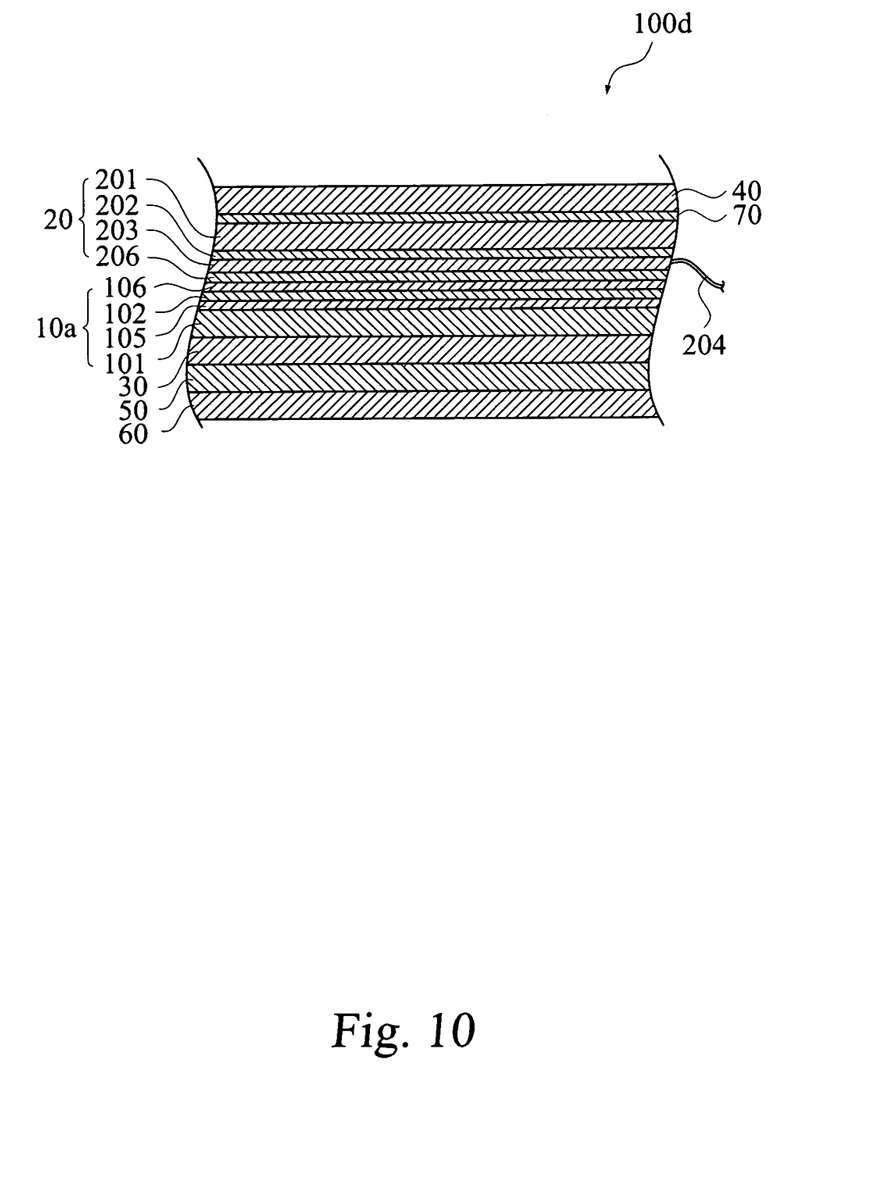
FIG. 10 is an assembled sectional view of a touch screen display with electric field shielding layer according to a fifth embodiment of the present invention.

Please refer to FIG. 10 that is an assembled sectional view of a touch screen display 100d with electric field shielding layer according to a fifth embodiment of the present invention. The fifth embodiment is generally structurally similar to the fourth embodiment, except that the electric field shielding layer 203 in the fifth embodiment is arranged between the color filter layer 202 of the color filter structure 20 and the common electrode layer 106 of the liquid crystal control structure 10a, and that an insulating layer 206 is further provided between the electric field shielding layer 203 and the common electrode layer 106. This structure also effectively isolates the signal interference between the liquid crystal layer 102 and the touch sensing layer 70 as well as the signal interference between the common electrode layer 106 and the touch sensing layer 70.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A touch screen display, comprising:
    a first glass substrate;
    a second glass substrate;
    a liquid crystal layer arranged between the first and the second glass substrate;
    a first polarizing plate arranged to a bottom surface of the first glass substrate opposite to the liquid crystal layer;
    a liquid crystal driving electrode layer formed between the first glass substrate and the liquid crystal layer, and including a plurality of horizontally staggered pixel electrodes and common electrodes for driving the liquid crystal layer;
    a color filter layer formed on a bottom surface of the second glass substrate facing toward the liquid crystal layer;
    a second polarizing plate arranged on a top surface of the second glass substrate opposite to the liquid crystal layer;
    a touch sensing layer formed between the second glass substrate and the second polarizing plate for sensing a touch signal when a pressure is applied against the touch sensing layer; and
    an electric field shielding layer with a transparent continuous plane structure arranged between the second glass substrate and the liquid crystal layer and electrically connected to a predetermined potential for isolating signal interference between the touch sensing layer and the liquid crystal layer.

2. The touch screen display as claimed in claim 1, wherein the electric field shielding layer with the transparent continuous plane structure is arranged between the color filter layer and the second glass substrate.

3. The touch screen display as claimed in claim 1, wherein the electric field shielding layer with the transparent continuous plane structure is arranged between the color filter layer and the liquid crystal layer.

4. The touch screen display as claimed in claim 1, further comprising an over-coating layer arranged between the liquid crystal layer and the color filter layer, and the electric field shielding layer with the transparent continuous plane structure being located between the color filter layer and the over-coating layer.

5. touch screen display as claimed in claim 1, wherein the electric field shielding layer with the transparent continuous plane structure is electrically connected to a zero voltage as the predetermined potential.

6. The touch screen display as claimed in claim 1, wherein the electric field shielding layer with the transparent continuous plane structure is electrically connected to a floating voltage as the predetermined potential.

7. A touch screen display, comprising:
    a first glass substrate;
    a second glass substrate;
    a liquid crystal layer arranged between the first and the second glass substrate;
    a first polarizing plate arranged to a bottom surface of the first glass substrate opposite to the liquid crystal layer;
    a pixel electrode layer, which comprises a plurality of pixel electrodes and is arranged to a bottom surface of the liquid crystal layer; a common electrode layer, which comprises a plurality of common electrodes corresponding to the plurality of pixel electrodes, the common electrode layer and the and the pixel electrode layer together forming, a liquid crystal driving, electrode layer for driving liquid crystal molecules of the liquid crystal layer;
    a color filter layer for surface of the second glass substrate facing toward the liquid crystal layer; a second polarizing plate arranged on a top surface of the second glass substrate opposite to the liquid crystal layer;
    a touch sensing layer formed between the second glass substrate and the second polarizing plate for sensing a touch signal when a pressure is applied against the touch sensing layer; and
    an electric field shielding layer with a transparent continuous plane structure arranged between the second glass substrate and the common electrode layer and electrically connected to a predetermined potential for isolating signal interference between the touch sensing layer and the liquid crystal layer.

8. The touch screen display as claimed in claim 7, wherein the electric field shielding layer with the transparent continuous plane structure is arranged between the color filter layer and the second glass substrate.

9. The touch screen display as claimed in claim 7, wherein the electric field shielding layer with the transparent continuous plane structure is arranged between the color filter layer and the common electrode layer, and an insulating layer is further provided between the electric field shielding layer with the transparent continuous plane structure and the common electrode layer.

10. The touch screen display as claimed in claim 7, wherein the electric field shielding layer with the transparent continuous plane structure is electrically connected to a zero voltage as the predetermined potential.

11. The touch screen display as claimed in claim 7, wherein the electric field shielding layer with the transparent continuous plane structure is electrically connected to a floating voltage as the predetermined potential.

* * * * *